(12) United States Patent
Menes et al.

(10) Patent No.: US 11,558,175 B2
(45) Date of Patent: Jan. 17, 2023

(54) CRYPTOGRAPHIC DATA COMMUNICATION APPARATUS

(71) Applicant: MELLANOX TECHNOLOGIES, LTD., Yokneam (IL)

(72) Inventors: Miriam Menes, Tel Aviv (IL); Noam Bloch, Bat Shlomo (IL); Adi Menachem, Hod Hasharon (IL); Idan Burstein, Karmiel (IL); Ariel Shahar, Jerusalem (IL); Maxim Fudim, Ashdod (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 136 days.

(21) Appl. No.: 17/233,591

(22) Filed: Apr. 19, 2021

(65) Prior Publication Data
US 2022/0045844 A1    Feb. 10, 2022

(30) Foreign Application Priority Data
Aug. 5, 2020  (IL) .......................................... 276538

(51) Int. Cl.
*H04L 9/06* (2006.01)
*H04L 9/08* (2006.01)
*H04L 9/32* (2006.01)

(52) U.S. Cl.
CPC .......... *H04L 9/0625* (2013.01); *H04L 9/0861* (2013.01); *H04L 9/3247* (2013.01)

(58) Field of Classification Search
CPC .... H04L 9/0625; H04L 9/0861; H04L 9/3247
See application file for complete search history.

(56) References Cited

U.S. PATENT DOCUMENTS 6,901,496 B1   5/2005  Mukund et al.
7,657,659 B1   2/2010  Lambeth et al.
(Continued)

FOREIGN PATENT DOCUMENTS

EP   1657878 A1    5/2006
EP   2463782 A2    6/2012
WO   2010062679 A2 6/2010

OTHER PUBLICATIONS

EP Application # 21189729.3 Search Report dated Jun. 29, 2022.
(Continued)

*Primary Examiner* — Darshan I Dhruv
(74) *Attorney, Agent, or Firm* — Kligler & Associates Patent Attorneys Ltd

(57) ABSTRACT

In one embodiment, data communication apparatus includes a network interface for connection to a network and configured to receive a sequence of data packets from a remote device over the network, the sequence including data blocks, ones of the data blocks having block boundaries that are not aligned with payload boundaries of the packets, and packet processing circuitry to cryptographically process the data blocks using a block cipher so as to write corresponding cryptographically processed data blocks to a memory, while holding segments of respective ones of the received data blocks in the memory, such that the packet processing circuitry stores a first segment of a data block of a first packet in the memory until a second packet is received, and then cryptographically processes the first and second segments together so as to write a corresponding cryptographically processed data block to the memory.

9 Claims, 12 Drawing Sheets

(56) References Cited

U.S. PATENT DOCUMENTS

| | | | |
|---|---|---|---|
| 8,006,297 B2 | 8/2011 | Johnson et al. | |
| 8,103,785 B2 | 1/2012 | Crowley et al. | |
| 8,824,492 B2 | 9/2014 | Wang et al. | |
| 8,879,435 B1 * | 11/2014 | Andersson | G11C 7/1012 370/473 |
| 9,038,073 B2 | 5/2015 | Kohlenz et al. | |
| 9,678,818 B2 | 6/2017 | Raikin et al. | |
| 9,904,568 B2 | 2/2018 | Vincent et al. | |
| 10,078,613 B1 | 9/2018 | Ramey | |
| 10,120,832 B2 | 11/2018 | Raindel et al. | |
| 10,135,739 B2 | 11/2018 | Raindel et al. | |
| 10,152,441 B2 | 12/2018 | Liss et al. | |
| 10,210,125 B2 | 2/2019 | Burstein | |
| 10,218,645 B2 | 2/2019 | Raindel et al. | |
| 10,423,774 B1 | 4/2019 | Zelenov et al. | |
| 10,382,350 B2 | 8/2019 | Bohrer et al. | |
| 10,715,451 B2 | 7/2020 | Raindel et al. | |
| 10,824,469 B2 | 11/2020 | Hirshberg et al. | |
| 10,841,243 B2 | 11/2020 | Levi et al. | |
| 10,956,346 B1 | 3/2021 | Ben-Yehuda et al. | |
| 2003/0023846 A1 | 1/2003 | Krishna et al. | |
| 2003/0226018 A1 * | 12/2003 | Tardo | H04L 63/08 713/168 |
| 2004/0039940 A1 | 2/2004 | Cox et al. | |
| 2004/0057434 A1 | 3/2004 | Poon et al. | |
| 2004/0062267 A1 | 4/2004 | Minami et al. | |
| 2004/0158710 A1 | 8/2004 | Buer et al. | |
| 2005/0102497 A1 | 5/2005 | Buer | |
| 2005/0198412 A1 | 9/2005 | Pedersen et al. | |
| 2006/0095754 A1 | 5/2006 | Hyder et al. | |
| 2006/0104308 A1 | 5/2006 | Pinkerton et al. | |
| 2008/0147822 A1 | 6/2008 | Benhase et al. | |
| 2008/0313364 A1 | 12/2008 | Flynn et al. | |
| 2009/0086736 A1 | 4/2009 | Foong et al. | |
| 2009/0106771 A1 | 4/2009 | Benner et al. | |
| 2009/0319775 A1 | 12/2009 | Buer et al. | |
| 2009/0328170 A1 | 12/2009 | Williams et al. | |
| 2010/0228962 A1 | 9/2010 | Simon et al. | |
| 2011/0119673 A1 | 5/2011 | Bloch et al. | |
| 2011/0246597 A1 | 10/2011 | Swanson et al. | |
| 2012/0314709 A1 | 12/2012 | Post et al. | |
| 2013/0080651 A1 | 3/2013 | Pope et al. | |
| 2013/0125125 A1 | 5/2013 | Karino et al. | |
| 2013/0142205 A1 | 6/2013 | Munoz | |
| 2013/0263247 A1 | 10/2013 | Jungck et al. | |
| 2013/0276133 A1 | 10/2013 | Hodges et al. | |
| 2013/0329557 A1 | 12/2013 | Petry | |
| 2013/0347110 A1 | 12/2013 | Dalal | |
| 2014/0129741 A1 | 5/2014 | Shahar et al. | |
| 2014/0185616 A1 | 7/2014 | Bloch et al. | |
| 2014/0254593 A1 | 9/2014 | Mital et al. | |
| 2014/0282050 A1 | 9/2014 | Quinn et al. | |
| 2014/0282561 A1 | 9/2014 | Holt et al. | |
| 2015/0100962 A1 | 4/2015 | Morita et al. | |
| 2015/0288624 A1 | 10/2015 | Raindel et al. | |
| 2015/0347185 A1 | 12/2015 | Holt et al. | |
| 2015/0355938 A1 | 12/2015 | Jokinen et al. | |
| 2016/0065659 A1 | 3/2016 | Bloch et al. | |
| 2016/0132329 A1 | 5/2016 | Gupte et al. | |
| 2016/0226822 A1 | 8/2016 | Zhang et al. | |
| 2016/0306668 A1 | 10/2016 | Heil et al. | |
| 2016/0342547 A1 | 11/2016 | Liss et al. | |
| 2016/0350151 A1 | 12/2016 | Zou et al. | |
| 2016/0378529 A1 | 12/2016 | Wen | |
| 2017/0075855 A1 | 3/2017 | Sajeepa et al. | |
| 2017/0180273 A1 | 6/2017 | Daly et al. | |
| 2017/0237672 A1 | 8/2017 | Dalal | |
| 2017/0264622 A1 | 9/2017 | Cooper et al. | |
| 2017/0286157 A1 | 10/2017 | Hasting et al. | |
| 2017/0371835 A1 | 12/2017 | Ranadive et al. | |
| 2018/0004954 A1 | 1/2018 | Liguori et al. | |
| 2018/0067893 A1 | 3/2018 | Raindel et al. | |
| 2018/0109471 A1 | 4/2018 | Chang et al. | |
| 2018/0114013 A1 | 4/2018 | Sood et al. | |
| 2018/0167364 A1 | 6/2018 | Dong et al. | |
| 2018/0210751 A1 | 7/2018 | Pepus et al. | |
| 2018/0219770 A1 | 8/2018 | Wu et al. | |
| 2018/0219772 A1 | 8/2018 | Koster et al. | |
| 2018/0246768 A1 | 8/2018 | Palermo et al. | |
| 2018/0262468 A1 | 9/2018 | Kumar et al. | |
| 2018/0267919 A1 * | 9/2018 | Burstein | G06F 13/4027 |
| 2018/0285288 A1 | 10/2018 | Bernat et al. | |
| 2018/0329828 A1 | 11/2018 | Apfelbaum et al. | |
| 2019/0012350 A1 | 1/2019 | Sindhu et al. | |
| 2019/0026157 A1 | 1/2019 | Suzuki et al. | |
| 2019/0044705 A1 * | 2/2019 | Deval | H04L 9/088 |
| 2019/0081904 A1 * | 3/2019 | Bohrer | H04L 47/20 |
| 2019/0102568 A1 * | 4/2019 | Hausauer | H04L 63/06 |
| 2019/0116127 A1 | 4/2019 | Pismenny et al. | |
| 2019/0123891 A1 * | 4/2019 | Pismenny | H04L 9/3242 |
| 2019/0132118 A1 * | 5/2019 | Ghosh | H04L 9/0838 |
| 2019/0163364 A1 | 5/2019 | Gibb et al. | |
| 2019/0173846 A1 | 6/2019 | Patterson et al. | |
| 2019/0190892 A1 | 6/2019 | Menachem et al. | |
| 2019/0250938 A1 | 8/2019 | Claes et al. | |
| 2020/0012604 A1 | 1/2020 | Agarwal | |
| 2020/0026656 A1 | 1/2020 | Liao et al. | |
| 2020/0169383 A1 * | 5/2020 | Durham | H04L 9/14 |
| 2020/0236140 A1 * | 7/2020 | Srinivasan | H04L 5/0055 |
| 2020/0259803 A1 | 8/2020 | Menachem et al. | |
| 2020/0314181 A1 | 10/2020 | Eran et al. | |
| 2020/0401440 A1 | 12/2020 | Sankaran et al. | |
| 2021/0111996 A1 * | 4/2021 | Pismenny | H04L 47/34 |

OTHER PUBLICATIONS

EP Application # 21189729.3 Partial Search Report dated Jan. 3, 2022.

Shirey., "Internet Security Glossary, Version 2", Request for Comments 4949, pp. 1-365, Aug. 2007.

Information Sciences Institute, "Transmission Control Protocol; DARPA Internet Program Protocol Specification", Request for Comments 793, pp. 1-90, Sep. 1981.

InfiniBand TM Architecture Specification vol. 1, Release 1.3, pp. 1-1842, Mar. 3, 2015.

Stevens., "TCP Slow Start, Congestion Avoidance, Fast Retransmit, and Fast Recovery Algorithms", Request for Comments 2001, pp. 1-6, Jan. 1997.

Metronome Systems, Inc., "Open vSwitch Offload and Acceleration with Agilio® CX SmartNICs", White Paper, pp. 1-7, Mar. 2017.

PCI Express® Base Specification ,Revision 3.0, pp. 1-860, Nov. 10, 2010.

Dierks et al., "The Transport Layer Security (TLS) Protocol Version 1.2", Request for Comments: 5246 , pp. 1-104, Aug. 2008.

Turner et al., "Prohibiting Secure Sockets Layer (SSL) Version 2.0", Request for Comments: 6176, pp. 1-4, Mar. 2011.

Rescorla et al., "The Transport Layer Security (TLS) Protocol Version 1.3", Request for Comments: 8446, pp. 1-160, Aug. 2018.

Comer., "Packet Classification: A Faster, More General Alternative to Demultiplexing", The Internet Protocol Journal, vol. 15, No. 4, pp. 12-22, Dec. 2012.

Salowey et al., "AES Galois Counter Mode (GCM) Cipher Suites for TLS", Request for Comments: 5288, pp. 1-8, Aug. 2008.

Burstein, "Enabling Remote Persistent Memory", SNIA-PM Summit, pp. 1-24, Jan. 24, 2019.

Chung et al., "Serving DNNs in Real Time at Datacenter Scale with Project Brainwave", IEEE Micro Pre-Print, pp. 1-11, Mar. 22, 2018.

Talpey, "Remote Persistent Memory—With Nothing But Net", SNIA—Storage developer conference , pp. 1-30, year 2017.

Microsoft, "Project Brainwave", pp. 1-5, year 2019.

NVM Express Inc., "NVM ExpressTM Base Specification", Revision 1.4, p. 1-403, Jun. 10, 2019.

Pismenny et al., "Autonomous NIC Offloads", submitted for evaluation of the 26th International Conference on Architectural Support for Programming Languages and Operating Systems (ASPLOS '21), p. 1-18, Dec. 13, 2020.

Pismenny et al., U.S. Appl. No. 17/204,968, filed Mar. 18, 2021.

U.S. Appl. No. 16/827,912 Office Action dated Jun. 1, 2021.

(56) References Cited

OTHER PUBLICATIONS

Lebeane et al., "Extended Task queuing: Active Messages for Heterogeneous Systems", Proceedings of the International Conference for High Performance Computing, Networking, Storage and Analysis (SC'16), pp. 933-944, Nov. 2016.

* cited by examiner

CRYPTOGRAPHIC DATA COMMUNICATION APPARATUS

RELATED APPLICATION INFORMATION

The present application claims priority from Israel Patent Application S/N 276,538, filed 5 Aug. 2020, the disclosure of which is hereby incorporated herein by reference.

FIELD OF THE INVENTION

The present invention relates to computer systems, and in particular, but not exclusively to, cryptographic processing in data communication apparatus.

BACKGROUND

Solid-state drives (SSDs) are mass-storage devices that use integrated circuit memory, typically NAND-based flash memory, to store data while providing an interface that emulates traditional hard disk drives (HDDs). By comparison with HDDs, SSDs offer faster access, lower latency, and greater resistance to environmental disturbances. Therefore, SSDs are gradually replacing HDDs in many storage applications.

Because SSDs were originally designed to take the place of HDDs, they have generally used the same sorts of input/output (I/O) buses and protocols as HDDs, such as SATA, SAS and Fibre Channel. Subsequently, SSDs have become available that connect directly to the peripheral component interface bus of a host computer, such as the PCI Express® (PCIe®) bus. NVM Express (NVMe) defines a register interface, command set and feature set for PCI Express SSDs.

Advanced network interface controllers (NICs) are designed to support remote direct memory access (RDMA) operations, in which the NIC transfers data by direct memory access from the memory of one computer into that of another without involving the central processing unit (CPU) of the target computer. Although RDMA is generally used to transfer data to and from host memory (RAM), a number of attempts to adapt RDMA functionality for reading and writing data directly to and from an SSD have been described in the patent literature. For example, U.S. Patent Application Publication 2008/0313364 describes a method for remote direct memory access to a solid-state storage device, which is said to allow direct access between memory of a client connected through a network to such a device. Similarly, U.S. Patent Application Publication 2011/0246597 describes a system in which a network interface component of a server may access a solid-state storage module of the server by a network storage access link that bypasses a central processing unit (CPU) and main memory of the server.

SUMMARY

There is provided in accordance with an embodiment of the present disclosure, data communication apparatus, including a network interface which includes one or more ports for connection to a packet data network and is configured to receive a sequence of data packets from a remote device over the packet data network via the one or more ports responsively to a data transfer request, the received sequence including received data blocks, ones of the received data blocks having block boundaries that are not aligned with payload boundaries of the packets, such that respective ones of the received data blocks are divided into two respective segments contained in successive respective ones of the packets in the sequence, and packet processing circuitry configured to cryptographically process the received data blocks using a block cipher so as to write corresponding cryptographically processed data blocks to a memory, while holding segments of respective ones of the received data blocks in the memory, such that the packet processing circuitry stores a first segment of a respective one of the received data blocks of a first one of the packets in the memory until a second one of the packets is received via the network interface, and then cryptographically processes the first and second segments together so as to write a corresponding cryptographically processed data block to the memory.

Further in accordance with an embodiment of the present disclosure, the apparatus includes a host interface configured to be connected to a host computer having a processing unit configured to manage fulfilment of the data transfer request, wherein the packet processing circuitry is configured to cryptographically process the received data blocks using the block cipher so as to write the corresponding cryptographically processed data blocks to the host computer via the host interface, while holding segments of respective ones of the received data blocks in the memory, such that the packet processing circuitry stores the first segment of the respective received data block of the first packet in the memory until the second packet is received via the network interface, and then cryptographically processes the first and second segments together so as to write the corresponding cryptographically processed data block to the host computer via the host interface. Still further in accordance with an embodiment of the present disclosure the packet processing circuitry is configured to find that the second segment is a partial block, and retrieve the first segment from the memory, and cryptographically process the first and second segments together as a whole block using the block cipher, responsively to the second segment being a partial block.

Additionally, in accordance with an embodiment of the present disclosure each of the data packets includes whole data blocks for cryptographically processing by the block cipher.

Moreover in accordance with an embodiment of the present disclosure the packet processing circuitry is configured to read cryptographic parameters registered in the memory by a processing unit, the cryptographic parameters including an initial cryptographic key and an initial value, compute a first cryptographic key responsively to the initial cryptographic key and the initial value, cryptographically process a first block of the received data blocks responsively to the first cryptographic key, compute an updated value responsively to the initial value and a size of the first block, compute a second cryptographic key responsively to the initial cryptographic key and the updated value, cryptographically process a second block of the received data blocks responsively to the second cryptographic key, and write the cryptographically processed first block and second block to the memory.

Further in accordance with an embodiment of the present disclosure the updated value is indicative of a storage location of the second block.

Still further in accordance with an embodiment of the present disclosure the packet processing circuitry is configured to encrypt the received data blocks using the block cipher so as to write corresponding ciphertext data blocks to the memory.

Additionally, in accordance with an embodiment of the present disclosure the packet processing circuitry is configured to compute respective signatures of the received data blocks or the ciphertext data blocks, and write the computed signatures to the memory.

Moreover, in accordance with an embodiment of the present disclosure the packet processing circuitry is configured to decrypt the received data blocks using the block cipher so as to write corresponding plaintext data blocks to the memory.

Further in accordance with an embodiment of the present disclosure the packet processing circuitry is configured to authenticate respective signatures of the received data blocks or the plaintext data blocks, and write respective ones of the plaintext data blocks to the memory responsively to respective ones of the signatures being authenticated.

There is also provided in accordance with another embodiment of the present disclosure, data communication apparatus, including a network interface which includes one or more ports for connection to a packet data network and is configured to receive a sequence of data packets from a remote device over the packet data network via the one or more ports responsively to a data transfer request, the received sequence including received data blocks, packet processing circuitry, which is configured to read cryptographic parameters from a memory in which the parameters were registered by a processing unit, the cryptographic parameters including an initial cryptographic key and an initial value, compute a first cryptographic key responsively to the initial cryptographic key and the initial value, cryptographically process a first block of the received data blocks responsively to the first cryptographic key, compute an updated value responsively to the initial value and a size of the first block, compute a second cryptographic key responsively to the initial cryptographic key and the updated value, cryptographically process a second block of the received data blocks responsively to the second cryptographic key, and write the cryptographically processed first block and second block to the memory.

There is also provided in accordance with still another embodiment of the present disclosure, data communication apparatus, including packet processing circuitry configured to receive data from a memory responsively to a data transfer request, and cryptographically process the received data in units of data blocks using a block cipher so as to add corresponding cryptographically processed data blocks to a sequence of data packets, the sequence including respective ones of the cryptographically processed data blocks having block boundaries that are not aligned with payload boundaries of respective one of the packets, such that respective ones of the cryptographically processed data blocks are divided into two respective segments, which are contained in successive respective ones of the packets in the sequence, and a network interface which includes one or more ports for connection to a packet data network and is configured to send the sequence of data packets to a remote device over the packet data network via the one or more ports.

Still further in accordance with an embodiment of the present disclosure, the apparatus includes a host interface, which is configured to be connected to a host computer including a processing unit configured to manage fulfilment of the data transfer request, wherein the packet processing circuitry is configured to receive the data from the host computer over the host interface responsively to the data transfer request.

Additionally in accordance with an embodiment of the present disclosure the packet processing circuitry is configured to receive a first data chunk from the memory, find that the first data chunk includes a first partial block, request a first additional data chunk from the memory, responsively to finding that the first data chunk includes the first partial block, cryptographically process the first partial block and the first additional data chunk together as a whole block using the block cipher yielding a first cryptographically processed data block, divide the first cryptographically processed data block into the first and second segments, add the first segment to the first packet, and store the second segment in the memory until the second packet is processed by the packet processing circuitry.

Moreover in accordance with an embodiment of the present disclosure the packet processing circuitry is configured to find the stored second segment in the memory, request a second data chunk from the memory, responsively to the found second segment, find that the second data chunk includes a second partial block, request an additional second data chunk from the memory, responsively to finding that the second data chunk includes the second partial block, cryptographically process the second data chunk without the second partial block using the block cipher yielding at least one second cryptographically processed data block, cryptographically process the second partial block and the additional second data chunk together as a whole block using the block cipher yielding an additional second cryptographically processed data block, divide the additional second cryptographically processed data block into third and fourth segments, add the second segment, the at least one second cryptographically processed data block, and the third segment to the second packet, and store the fourth segment in the memory until a third packet is processed by the packet processing circuitry.

Further in accordance with an embodiment of the present disclosure each of the data packets includes respective whole ones of the cryptographically processed data blocks.

Still further in accordance with an embodiment of the present disclosure the packet processing circuitry is configured to read cryptographic parameters registered in the memory by a processing unit, the cryptographic parameters including an initial cryptographic key and an initial value, compute a first cryptographic key responsively to the initial cryptographic key and the initial value, cryptographically process a first block of the received data blocks responsively to the first cryptographic key, compute an updated value responsively to the initial value and a size of the first block, compute a second cryptographic key responsively to the initial cryptographic key and the updated value, and cryptographically process a second block of the received data blocks responsively to the second cryptographic key.

Additionally, in accordance with an embodiment of the present disclosure the updated value is indicative of a storage location of the second block.

Moreover, in accordance with an embodiment of the present disclosure the packet processing circuitry is configured to encrypt the received data blocks using the block cipher so as to add corresponding ciphertext data blocks to the sequence of data packets.

Further in accordance with an embodiment of the present disclosure the packet processing circuitry is configured to compute respective signatures of the received data blocks or the ciphertext data blocks, and add the computed signatures to the sequence of data packets.

Still further in accordance with an embodiment of the present disclosure the packet processing circuitry is configured to decrypt the received data blocks using the block cipher so as to add corresponding plaintext data blocks to the sequence of data packets.

Additionally, in accordance with an embodiment of the present disclosure the packet processing circuitry is configured to authenticate respective signatures of the received data blocks or the plaintext data blocks, and add respective ones of the plaintext data blocks to the sequence of data packets responsively to respective ones of the signatures being authenticated.

There is also provided in accordance with still another embodiment of the present disclosure, data communication apparatus, including packet processing circuitry configured to receive data from a memory responsively to a data transfer request, and read cryptographic parameters registered in the memory by a processing unit, the cryptographic parameters including an initial cryptographic key and an initial value, compute a first cryptographic key responsively to the initial cryptographic key and the initial value, cryptographically process a first block of the received data responsively to the first cryptographic key, compute an updated value responsively to the initial value and a size of the first block, compute a second cryptographic key responsively to the initial cryptographic key and the updated value, cryptographically process a second block of the received data blocks responsively to the second cryptographic key, and packetize the first and second block in at least one packet, and a network interface which includes one or more ports for connection to a packet data network and is configured to send the at least one packet to a remote device over the packet data network via the one or more ports.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
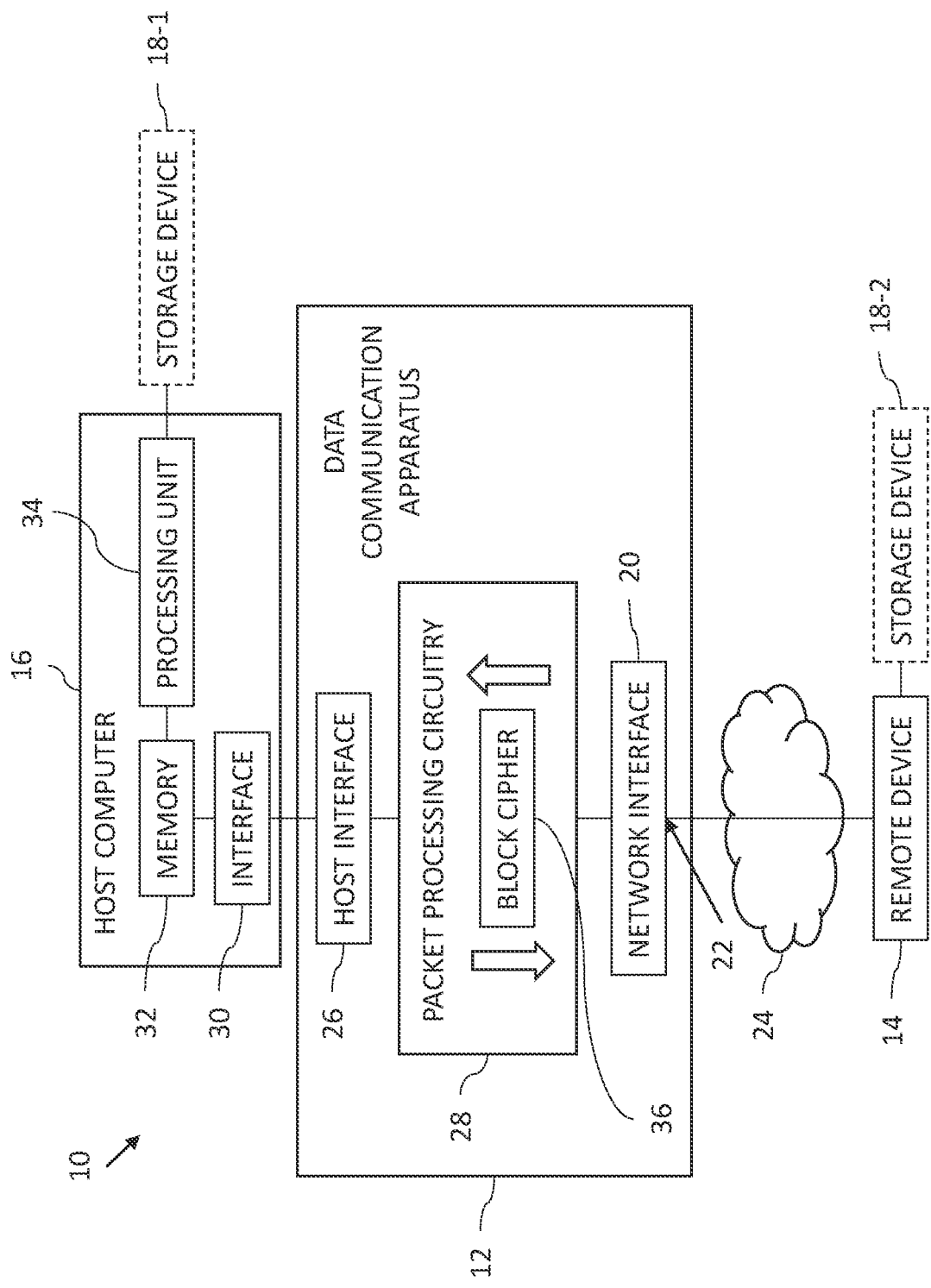
FIG. 1 is a block diagram view of data communication system constructed and operative in accordance with an embodiment of the present invention.

Data may be stored in a storage device in an encrypted form using a self-encrypting disk to protect the data at rest. When data is retrieved from the storage device by an authorized entity, for example, based on an RDMA request, the data may be decrypted by the storage device. Encryption and decryption by the storage device may be inefficient and involve additional latency.

One solution is to perform encryption of data to be stored (and/or decryption of data retrieved from storage) in data communication apparatus such as a network interface controller (NIC). The encryption and/or decryption may be performed as part of the packet processing pipeline. For example, data retrieved from a local storage device for sending to a remote device, may be decrypted in the NTC and then packetized for sending over a network to the remote device. Data received from a local host for storing in a remote storage device may be encrypted in the NIC and then packetized for sending over the network to the remote storage device. In another example, packets received from a remote device for storing in a local storage device may be encrypted in the NIC for storage in the local storage device. Packets received from a remote storage device may be decrypted in the NIC for transferring to a local host.

The data stored in the storage device may be stored in blocks having sizes which are defined by the storage device, for example, in blocks of 512 or 520 bytes. However, when the data is encrypted using a block cipher (e.g., using AES or any suitable block cipher), the block size (e.g., 16 bytes) of the block cipher may not align with the size of the storage blocks. Additionally, the packets used to transfer the data across the network may not comply with either the block cipher size or the block size used by the storage device. In some applications the payload size of the packets may be fixed or may be dynamic. The above creates a problem when performing encryption and decryption in the NIC, which is generally processing data according to packet size.

Embodiments of the present invention solve the above problems by providing data communication apparatus that detects partial data blocks in data received from a memory (e.g., from a host memory of a host computer) and requests additional data so that whole blocks conforming with the size of the block cipher may be cryptographically processed (e.g., encrypted or decrypted) by the block cipher. Some of the cryptographically processed data blocks may be non-aligned with packet boundaries of packets to which the cryptographically processed data blocks are to be added. Therefore, the non-aligned blocks are split into respective segments with one segment being included in one packet and the other segment being included in a subsequent packet.

When packets are received by the data communication apparatus, the packets may similarly include one or more partial data blocks. The data communication apparatus cryptographically processes (e.g., encrypts or decrypts) the whole data blocks conforming with the size of the block cipher and writes the cryptographically processed whole data blocks to memory (for example, to the host memory of the host computer). A partial block may be stored in memory until the next packet is received. The stored partial block is then retrieved from memory and cryptographically processed (e.g., encrypted or decrypted) with a partial block from the next packet so that a whole data block conforming with the size of the block cipher is cryptographically processed and written to memory (for example, to a host memory or a host computer).

In some embodiments, cryptographically processing may include computing signatures for encrypted blocks or blocks to be encrypted. The computed signatures may be stored (in memory) or sent (to the remote device) with the encrypted blocks.

In some embodiments, cryptographically processing may include authenticating signatures associated with decrypted blocks or blocks to be decrypted. Providing a decrypted block (e.g., plaintext block) to a memory or the remote device may be contingent on the signature of that block being authenticated.

In some embodiments, the blocks are cryptographically processed according to cryptographic parameters registered in memory (e.g., host memory) by a processing unit, such as, a central processing unit (CPU) or a graphics processing unit (GPU) of a host computer. The GPU may be configured to implement a graphics rendering pipeline to perform various operations related to generating pixel data based on graphics data supplied by a central processing unit (CPU). GPUs are employed to generate three-dimensional (3D) graphics objects and two-dimensional (2D) graphics objects for a variety of applications, including feature films, computer games, virtual reality (VR) and augmented reality (AR) experiences, mechanical design, and/or the like.

The cryptographic parameters may include the block size of the block cipher, an initial value, and an initial cryptographic key. The cryptographic key used to cryptographically process an initial block may be computed based on the initial value and the initial cryptographic key. The initial value is generally updated for subsequent blocks, for example, the size of the block. For example, if the initial value is 2000, the updated value for the next block may be equal to 2016 based on the 16-byte block size. The cryptographic key used to cryptographically process subsequent blocks may be computed based on the updated value and the initial cryptographic key. In some embodiments, the updated value is indicative of the storage location of the current block being cryptographically processed. In some embodiments, the update value may comprise two values, for example, one value indicative of the storage block number and another value indicative of a location within that storage block.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES (e.g., XTS-AES). Similarly, the terms "descrambled" and "decrypted" are used throughout the present specification and claims, in all their grammatical forms, to refer to the reverse of "scrambled" and "encrypted" in all their grammatical forms.

The block cipher may use any suitable encryption/decryption type and/or mode and may process blocks of any suitable size.

System Description

Reference is now made to FIG. 1, which is a block diagram view of data communication system 10 constructed and operative in accordance with an embodiment of the present invention. The data communication system 10 includes data communication apparatus 12, a remote device 14, a host computer 16, and at least one storage device 18.

The data communication apparatus 12 includes a network interface 20, which comprises one or more ports 22 for connection to a packet data network 24. The remote device 14 is connected to the data communication apparatus 12 via the packet data network 24.

The data communication apparatus 12 also includes a host interface 26, which is configured to be connected to the host computer 16 via a suitable connection. The data communication apparatus 12 also includes packet processing circuitry 28, which processes data packets received over the network interface 20 from the remote device 14 or any other remote device, and processes data and packetizes that data for sending over the network interface 20 to the remote device 14 or any other remote device. The packet processing circuitry 28 includes a block cipher 36 for performing cryptographic processing such as encryption, decryption, signature generation and authentication, by way of example only.

In practice, some or all of the functions of the packet processing circuitry 28 may be combined in a single physical component or, alternatively, implemented using multiple physical components. These physical components may comprise hard-wired or programmable devices, or a combination of the two. In some embodiments, at least some of the functions of the packet processing circuitry 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The host computer 16 includes an interface 30, a memory 32, and a processing unit 34. The interface 30 connects the host computer 16 to the data communication apparatus 12 via the host interface 26. The memory 32 stores data used by the processing unit 34 and optionally used by the data communication apparatus 12. For example, the data communication apparatus 12 may write data to the memory 32 and read data from the memory 32. In some embodiments, the data communication apparatus 12 may include its own memory in which it stores data, while other data is optionally stored in the memory 32. The processing unit 34 may be connected locally to a storage device 18-1.

The remote device 14 may be connected locally to a storage device 18-2.

The processing unit 34 is configured to manage fulfilment of a data transfer request. The data transfer request may originate from the remote device 14 or from the host computer 16 or from any other suitable device. The data transfer request may include any one or more of the following: a request from the remote device 14 (or any suitable device) to store data in the storage device 18-1; a request from the remote device 14 (or any suitable device) to retrieve data from the storage device 18-1; a request from the host computer 16 to store data in the storage device 18-2; and a request from the host computer 16 to read data from the storage device 18-2. The data transfer request may include transferring data to or from another remote device via the data communication apparatus 12 with or without involvement of the processing unit 34 of the host computer 16. In some embodiments, the data communication apparatus 12 may include its own processing unit or array of processing units to process the data transfer request. The processing unit 34 may fulfil the data transfer request in accordance with any suitable protocol, for example, RDMA.

In practice, some or all of the functions of the processing unit 34 may be combined in a single physical component or, alternatively, implemented using multiple physical components. These physical components may comprise hard-wired or programmable devices, or a combination of the two. In some embodiments, at least some of the functions of the processing unit 34 may be carried out by a programmable processor (e.g., CPU or GPU) under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
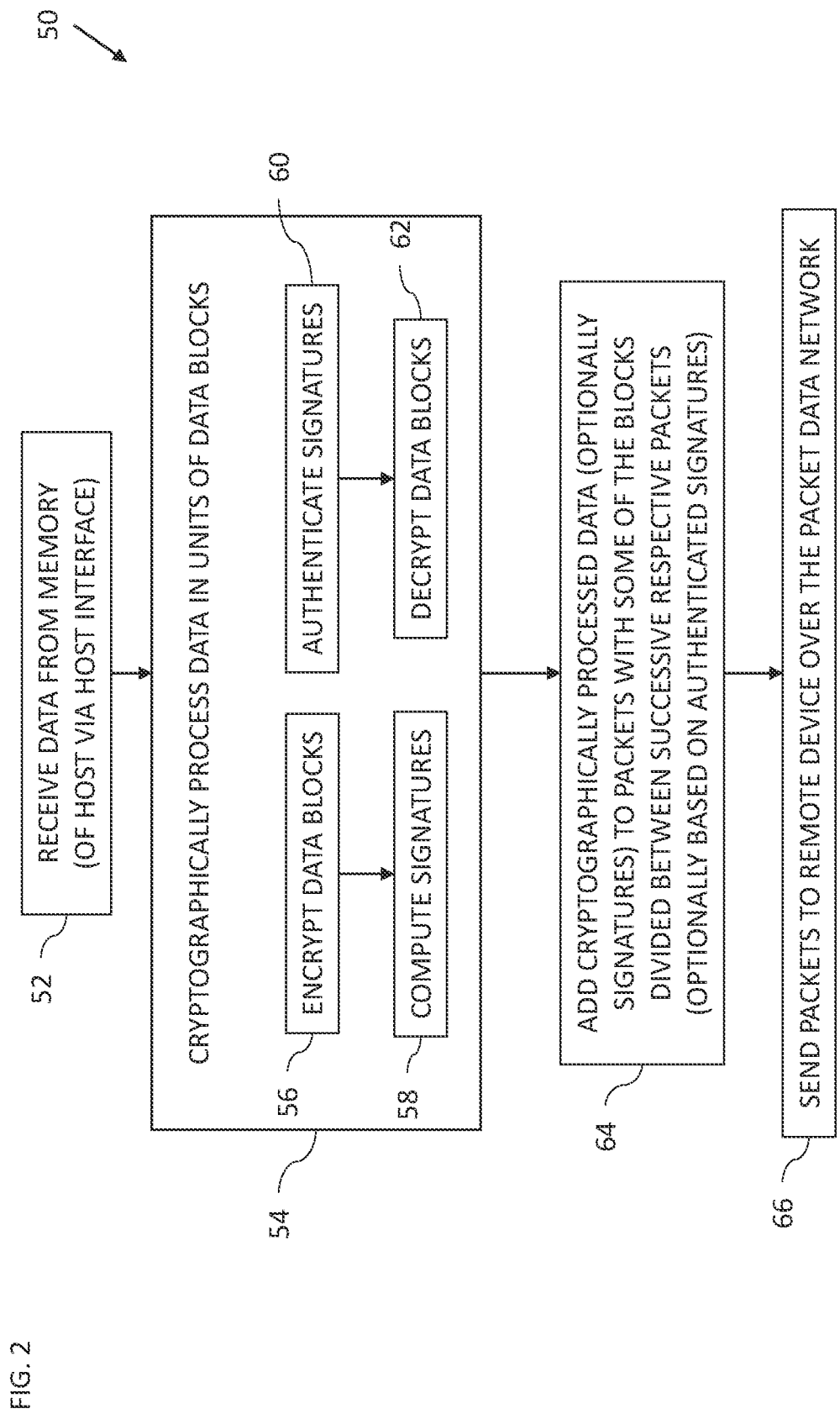
FIG. 2 is a flowchart including steps in a method of cryptographically processing data blocks for sending in packets to a remote device in the system of FIG. 1.

Reference is now made to FIG. 2, which is a flowchart 50 including steps in a method of cryptographically processing data blocks for sending in packets to the remote device 14 (FIG. 1) in the system 10 of FIG. 1. Reference is also made to FIG. 1.

The packet processing circuitry 28 is configured to receive (block 52) data from the memory 32 (or any other suitable memory). The data may be provided in the memory 32 according to a data transfer request from the remote device 14 and/or the data communication apparatus 12. In some embodiments, the packet processing circuitry 28 is configured to receive the data from the host computer 16 over the host interface 26 via the memory 32 responsively to the data transfer request. In some embodiments, the data is read from the storage device 18-1 and written in the memory 32 from where is it is read by the data communication apparatus 12.

The packet processing circuitry 28 is configured to cryptographically process (block 54) the received data in units of data blocks using the block cipher 36 so as to add corresponding cryptographically processed data blocks to a sequence of data packets. The sequence of packets may include some cryptographically processed data blocks having block boundaries that are not aligned with (i.e. straddle) payload boundaries of respective packets, such that some cryptographically processed data blocks are divided into two respective segments, which are contained in successive respective ones of the packets in the sequence. For example, a cryptographically processed data block may be divided with one part of the cryptographically processed data block being disposed in one packet and another part of the cryptographically processed data block being disposed in another (adjacent) packet.

The packets generally include whole cryptographically processed data blocks and may also include one or more partial data blocks. For example, some of the packets may include one partial block (either at the beginning or the end of the packet payload), some packets may include two partial blocks (one at the beginning and one at the end of the packet payload), and some packets may include whole data blocks without any partial data blocks in the packet payload.

The processing of partial data blocks is described in more detail with reference to FIGS. 3-6.

The step of block 54 may include one or more sub-steps of blocks 56-62 described in more detail below.

If the received data blocks are plaintext, the packet processing circuitry 28 is configured to encrypt (block 56) the received data blocks using the block cipher 36 so as to add corresponding ciphertext data blocks to the sequence of data packets. The packet processing circuitry 28 is optionally configured to compute (block 58) respective signatures of the received data blocks or the ciphertext data blocks. The steps of blocks 56 and 58 may be performed in any order. For example, the signatures may be computed based on plaintext blocks or on ciphertext blocks. Computation of cryptographic keys is described in more detail with reference to FIG. 7.

If the received data blocks are ciphertext, the packet processing circuitry 28 is optionally configured to authenticate (block 60) respective signatures of the received data blocks or the plaintext data blocks (i.e., after decryption). The packet processing circuitry 28 is configured to decrypt (block 62) the received data blocks using the block cipher 36 so as to add corresponding plaintext data blocks to the sequence of data packets. The steps of blocks 60 and 62 may be performed in any order. For example, the signatures may be authenticated using the plaintext blocks or the ciphertext blocks.

The packet processing circuitry 28 is configured to add (block 64) the cryptographically processed data blocks to their respective packets with some of the blocks being divided between successive respective packets. In some embodiments, the packet processing circuitry 28 is configured to add the computed signatures to the sequence of data packets. In some embodiments, the packet processing circuitry 28 is configured to add respective ones of the plaintext data blocks to the sequence of data packets responsively to respective ones of the signatures being authenticated. In other words, plaintext data blocks of which corresponding signatures have been successfully authenticated are added to the packets, while plaintext data blocks where their corresponding signatures have not been successfully authenticated are not added to the packets.

The network interface 20 is configured to send (block 66) the sequence of data packets to the remote device 14 over the packet data network 24 via the one or more ports 22.

Figure 3:
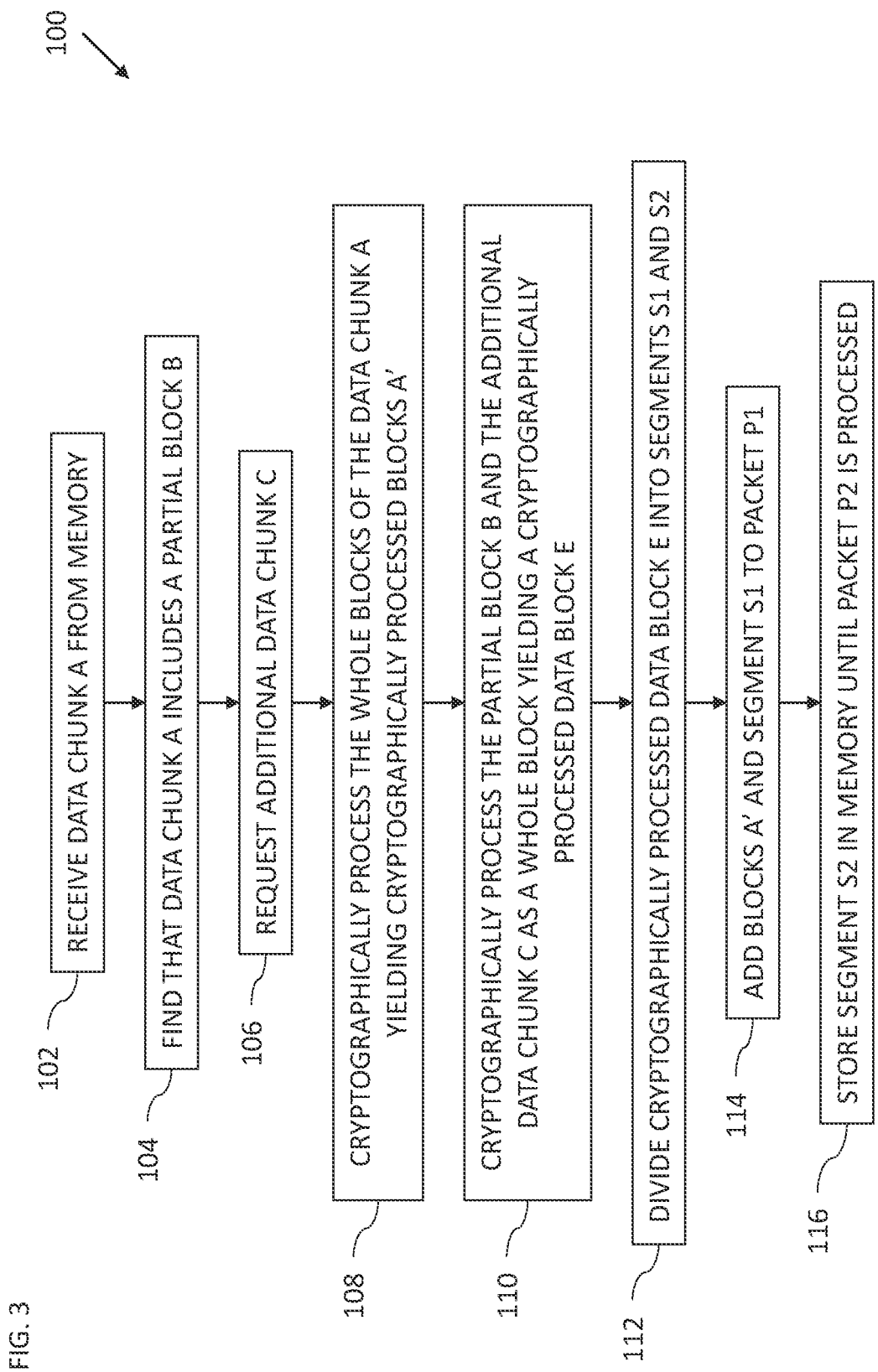
FIG. 3 is a flowchart including steps in a method of cryptographically processing data blocks for sending in a first packet in the system of FIG. 1.
Figure 4:
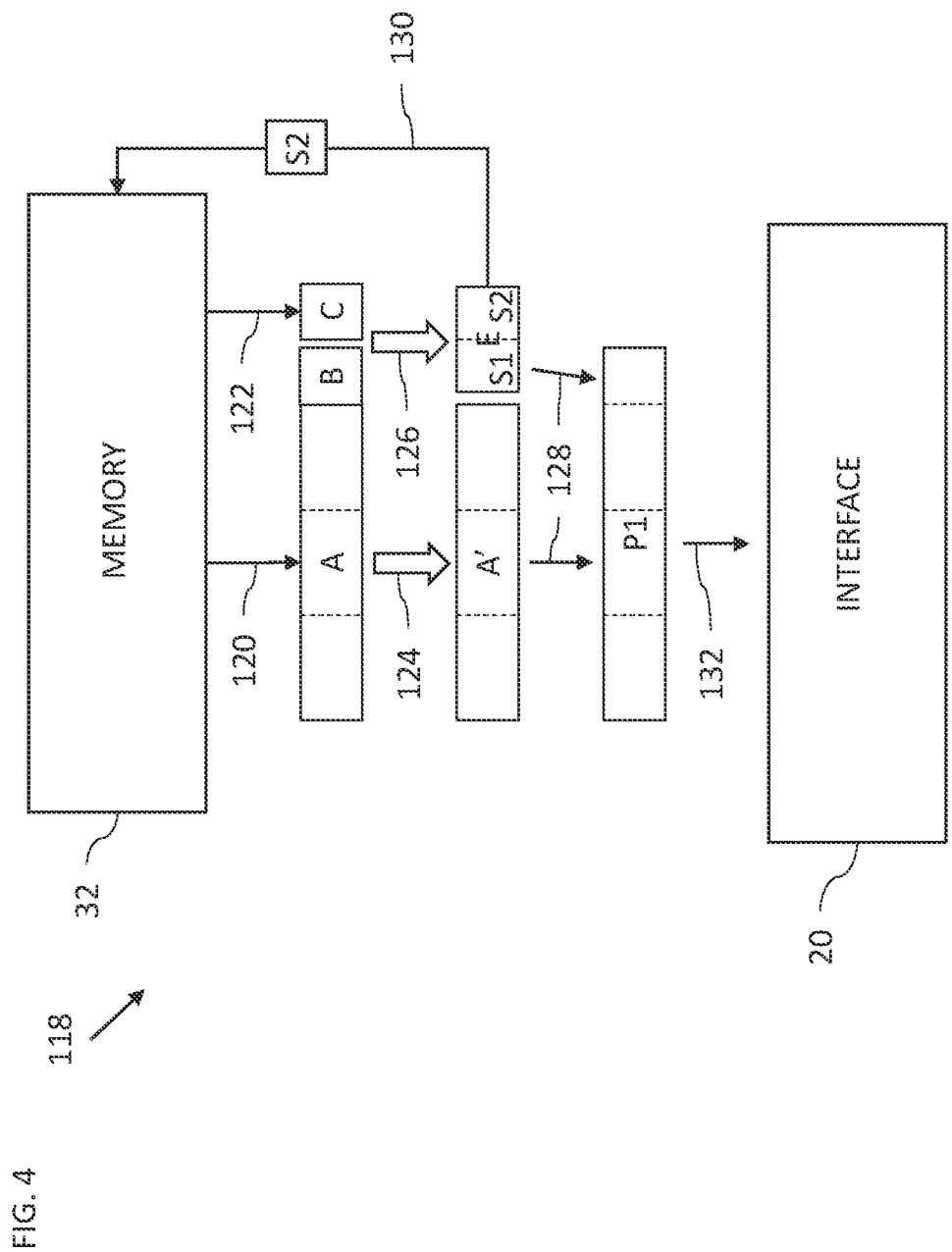
FIG. 4 is a block diagram illustrating the method of the flowchart of FIG. 3.

Reference is now made to FIGS. 3 and 4. FIG. 3 is a flowchart 100 including steps in a method of cryptographically processing data blocks for sending in a packet P1 in the system 10 of FIG. 1. FIG. 4 is a block diagram 118 illustrating the method of the flowchart 100 of FIG. 3 showing the flow of data between the memory 32 and the network interface 20. Reference is also made to FIG. 1.

The packet processing circuitry 28 is configured to receive (block 102, arrow 120 in FIG. 4) a data chunk A from the memory 32 (or any suitable memory). The packet processing circuitry 28 is configured to find (block 104) that data chunk A includes a partial block B. The packet processing circuitry 28 is configured to request (block 106, arrow 122 in FIG. 4) an additional data chunk C from a memory controller (not shown) of the memory 32, responsively to finding that data chunk A includes partial block B.

The packet processing circuitry 28 is configured to cryptographically process (block 108, arrow 124 in FIG. 4) the whole blocks of data chunk A yielding cryptographically processed blocks A'. The packet processing circuitry 28 is configured to cryptographically process (block 110, arrow 126 in FIG. 4) the partial block B and additional data chunk C together as a whole block using the block cipher 36 yielding a cryptographically processed data block E. The packet processing circuitry 28 is configured to divide (block 112) cryptographically processed data block E into segments S1 an S2.

The packet processing circuitry 28 is configured to add (block 114, arrows 128 in FIG. 4) blocks A' and segment S1 to the packet P1, which is then forwarded (arrow 132 in FIG. 4) to the network interface 20. The packet processing circuitry 28 is configured to store (block 116, arrow 130 in FIG. 4) segment S2 in the memory 32 (or any suitable memory) until a packet P2 is processed by the packet processing circuitry 28 as described in more detail with reference to FIGS. 5 and 6.

Figure 5:
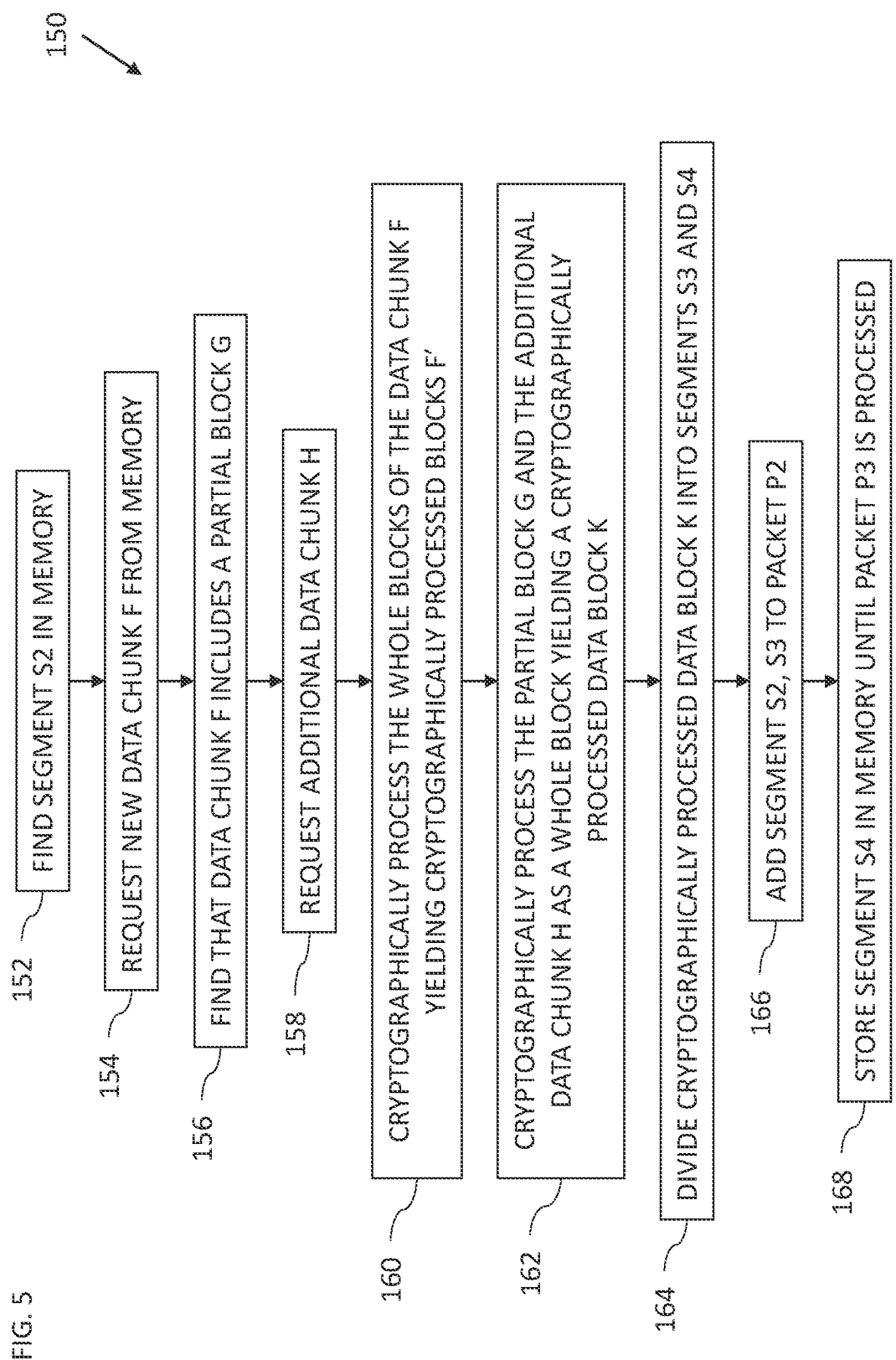
FIG. 5 is a flowchart including steps in a method of cryptographically processing data blocks for sending in a second packet in the system of FIG. 1.
Figure 6:
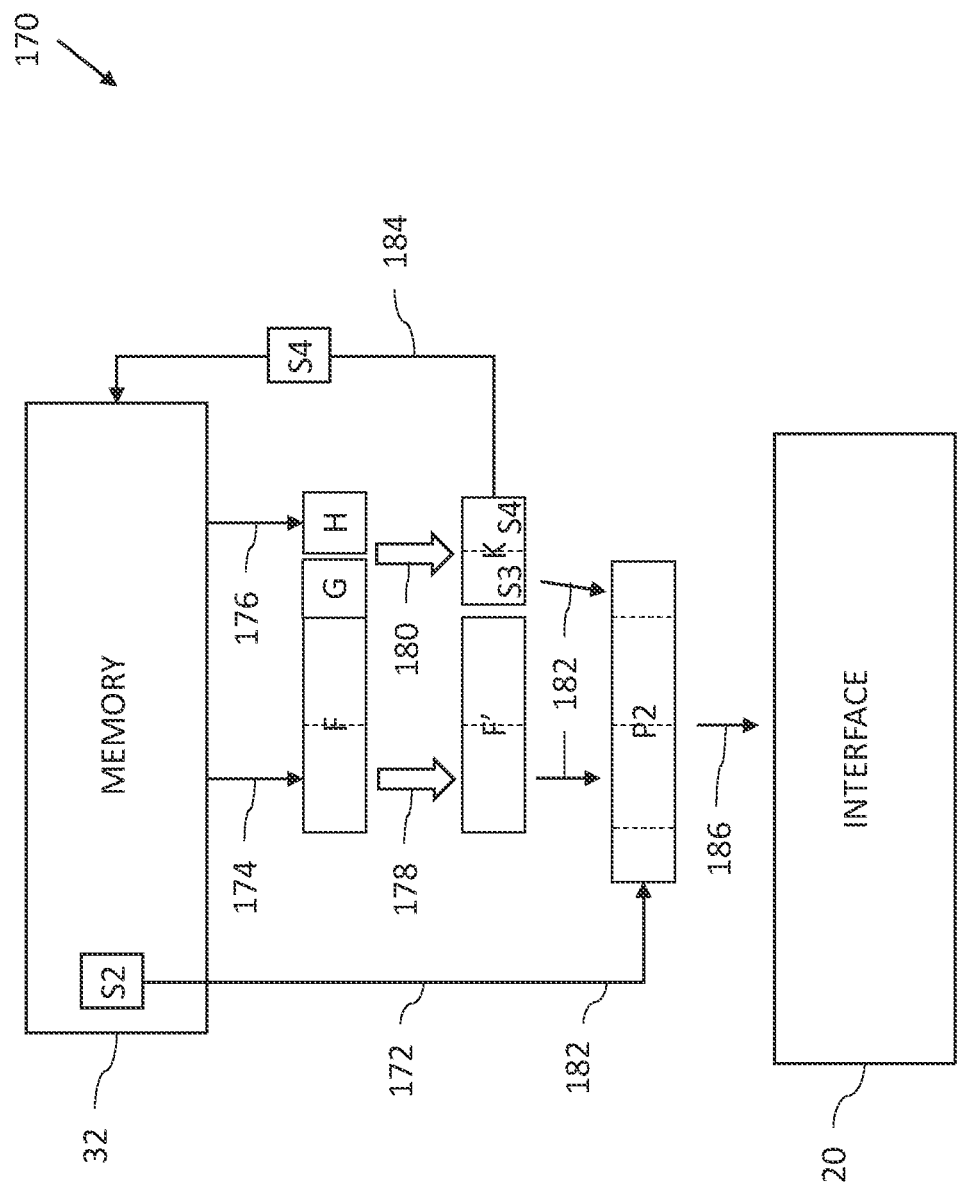
FIG. 6 is a block diagram illustrating the method of the flowchart of FIG. 5.

Reference is now made to FIGS. 5 and 6. FIG. 5 is a flowchart 150 including steps in a method of cryptographically processing data blocks for sending in a packet P2 in the system 10 of FIG. 1. FIG. 6 is a block diagram 170 illustrating the method of the flowchart of FIG. 5. Reference is also made to FIG. 1.

The packet processing circuitry 28 is configured to find (block 152, arrow 172 of FIG. 6) the stored segment S2 in the memory 32 (or any suitable memory) and retrieve segment S2 from the memory 32. The packet processing circuitry 28 is configured to request (block 154, arrow 174 of FIG. 6) a new data chunk F from the memory controller of the memory 32 (or any suitable memory). The packet processing circuitry 28 may be configured to adjust a size of the data chunk F, responsively to the found segment S2. For example, if the packet processing circuitry 28 generally requests a data chunk having a size suitable for adding to a packet, the packet processing circuitry 28 may adjust its request to reduce the size of the data chunk request by the size of segment S2 (i.e., the requested size will be equal to the general packet size less the size of segment S2).

The packet processing circuitry 28 is configured to find (block 156) that data chunk F includes a partial block G. In some cases, the data chunk may include a whole number of blocks without a partial block. The packet processing circuitry 28 is configured to request (block 158, arrow 176 of FIG. 6) an additional data chunk H from the memory controller of the memory 32 (or any suitable memory), responsively to finding that data chunk F includes the partial block G.

The packet processing circuitry 28 is configured to cryptographically process (block 160, arrow 178 of FIG. 6) the whole block(s) of data chunk F (i.e., data chunk F without partial block G) using the block cipher 36 yielding cryptographically processed data block(s) F'. The packet processing circuitry 28 is configured to cryptographically process (block 162, arrow 180 of FIG. 6) the partial block G and additional data chunk H together as a whole block using the block cipher 36 yielding an additional cryptographically processed data block K.

The packet processing circuitry 28 is configured to divide (block 164) cryptographically processed data block K into segments S3 and S4. The packet processing circuitry 28 is configured to add (block 166, arrows 182 of FIG. 6) segment S2, cryptographically processed data block(s) F', and segment S3 to packet P2, which is then forwarded (arrow 186 of FIG. 6) to the network interface 20. The packet processing circuitry 28 is configured to store (block 168, arrow 184 of FIG. 6) segment S4 in the memory 32 (or any suitable memory) until a packet P3 is processed by the packet processing circuitry 28, and so on.

Figure 7:
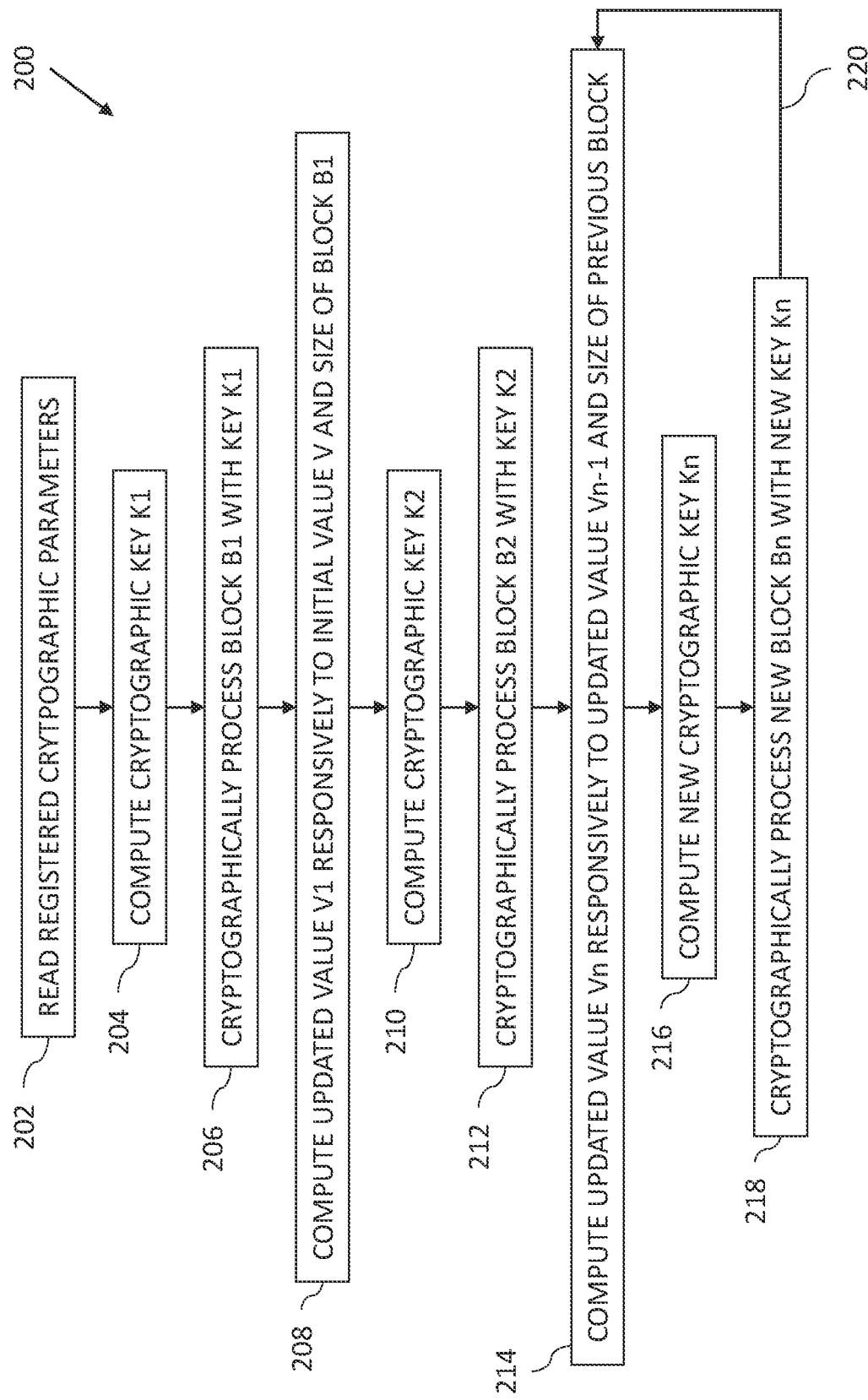
FIG. 7 is a flowchart including steps in a method of key computation in the system of FIG. 1.

Reference is now made to FIG. 7, which is a flowchart 200 including steps in a method of key computation in the system 10 of FIG. 1. Reference is also made to FIG. 1. The steps described below may be used for key computation whether the data communication apparatus 12 is processing packets received over the packet data network 24 or packets to be sent over the packet data network 24.

The processing unit 34 of the host computer 16 or another processing unit (for example in the data communication apparatus 12) is configured to register cryptographic parameters in the memory 32 (or any suitable memory), for example, responsively to the data transfer request. The cryptographic parameters may include an initial cryptographic key K, an initial value V, and a block size of the block cipher 36. The cryptographic parameters may be registered in the memory 32 with other parameters, for example, as part of an M-key.

The packet processing circuitry 28 is configured to read (block 202) the cryptographic parameters registered in the memory 32 (or any suitable memory).

The packet processing circuitry 28 is configured to compute (block 204) a cryptographic key K1 responsively to the initial cryptographic key K and the initial value V. The computation may be according to any suitable key modification algorithm, for example, combing K and V using an XOR operation, or encrypting V using K. The packet processing circuitry 28 is configured to cryptographically process (block 206) a block B1 of the received data blocks responsively to the cryptographic key K1.

The packet processing circuitry 28 is configured to compute (block 208) an updated value V1 responsively to the initial value V and a size of block B1 or any other suitable value. The updated value V1 may be indicative of a storage location of a block B2. For example, if the initial value V is 2000, the updated value V1 for the next block may be equal to 2016 based on the 16-byte block size. The cryptographic key used to cryptographically process subsequent blocks may be computed based on the updated value and the initial cryptographic key K or the key used for the previous encryption, e.g., K1. In some embodiments, the updated value is indicative of the storage location (in the storage device 18-1 or the storage device 18-2) of the block to be cryptographically processed. In some embodiments, the update value may comprise two values, for example, one value indicative of the storage block number (i.e. a block reference of a block of data in one of the storage devices 18) and another value indicative of a location within that storage block.

The packet processing circuitry 28 is configured to compute (block 210) a cryptographic key K2 responsively to the initial cryptographic key K (or the key K1) and the updated value V1. The packet processing circuitry 28 is configured to cryptographically process (block 212) a block B2 of the received data blocks responsively to the cryptographic key K2.

For a subsequent block $B_n$, the packet processing circuitry 28 is configured to compute (block 214) a new updated value $V_n$ responsively to the previous updated value $V_{n-1}$ and a size of the previous block $B_{n-1}$ (or any suitable value). The updated value $V_n$ may be indicative of a storage location of the block $B_n$. The packet processing circuitry 28 is configured to compute (block 216) a cryptographic key $K_n$, responsively to the initial cryptographic key K (or $K_{n-1}$) and the updated value $V_n$. The packet processing circuitry 28 is configured to cryptographically process (block 218) block $B_n$ responsively to the cryptographic key $K_n$. The steps of blocks 214-218 may be repeated (arrow 220) for subsequent blocks.

Figure 8:
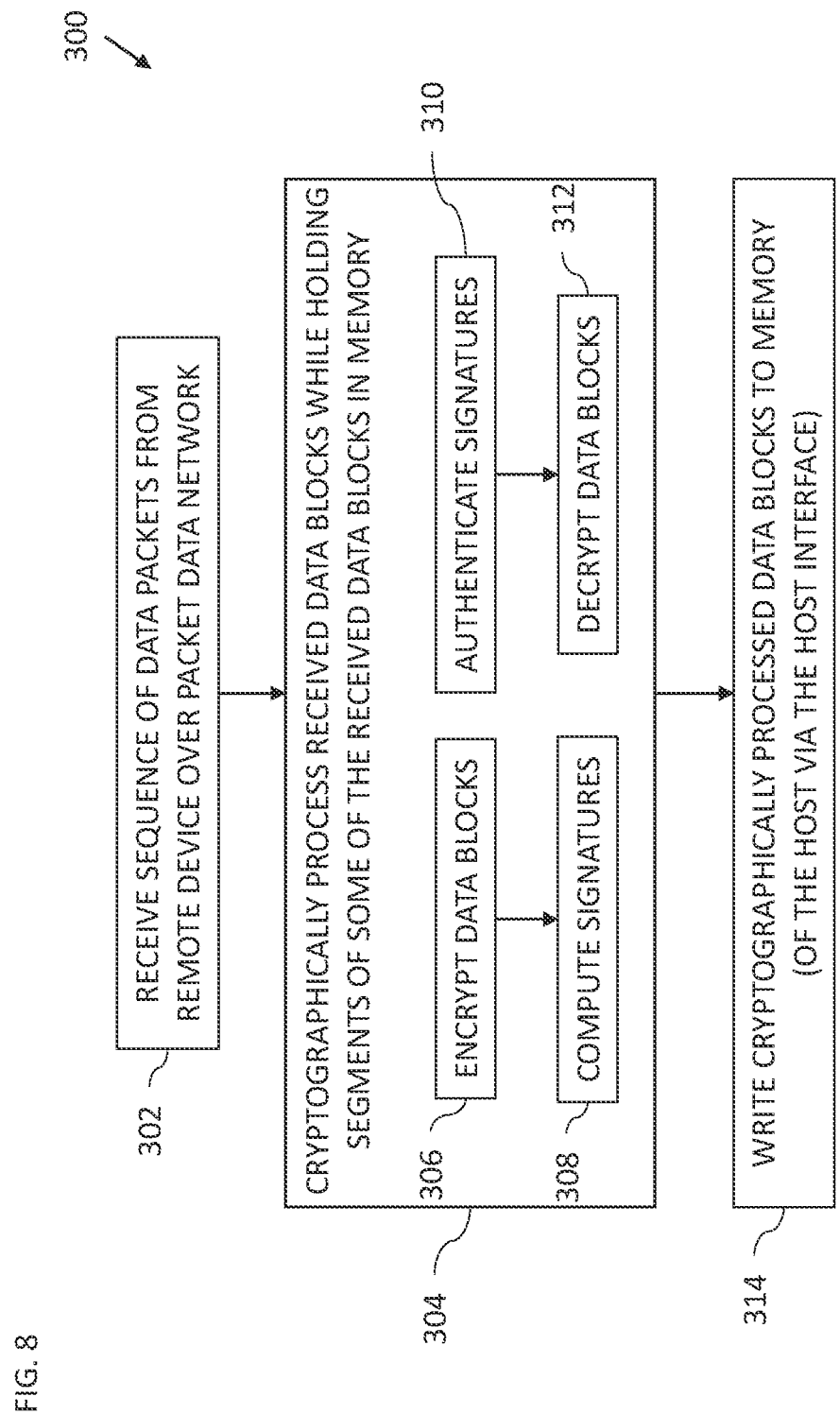
FIG. 8 is a flowchart including steps in a method of cryptographically processing data blocks of received packets in the system of FIG. 1.

Reference is now made to FIG. 8, which is a flowchart 300 including steps in a method of cryptographically processing data blocks of received packets in the system 10 of FIG. 1. Reference is also made to FIG. 1.

The network interface 20 of the data communication apparatus 12 is configured to receive (block 302) a sequence of data packets from the remote device 14 over the packet data network 24 via the port(s) 22 responsively to a data transfer request. The received sequence of packets includes received data blocks. Some of the received data blocks have block boundaries that are not aligned with (i.e. straddle) payload boundaries of at least some of the packets, such that respective received data blocks are divided into two respective segments contained in successive respective packets in the sequence. For example, a data block may be divided with one part of the data block being disposed in one packet and another part of the data block being disposed in another (adjacent) packet. The packets generally include whole data blocks and may also include one or more partial data blocks. For example, some of the packets may include one partial block (either at the beginning or the end of the packet payload), some packets may include two partial blocks (one at the beginning and one at the end of the packet payload), and some packets may include whole data blocks without any partial data blocks.

The packet processing circuitry 28 is configured to cryptographically process (block 304) the received data blocks using the block cipher 36 so as to write corresponding cryptographically processed data blocks to the memory 32 (or any suitable memory), while holding segments of some of the received data blocks in the memory 32, such that the packet processing circuitry 28 stores a segment S1 of a respective received data block B1 of a packet P1 in the memory 32 (or any suitable memory) until a packet P2 (including a segment S2 of the data block B1) is received via the network interface 20, and then cryptographically processes segments S1 and S2 together so as to write a corresponding cryptographically processed data block to the memory 32 (or any suitable memory). The processing of partial data blocks is described in more detail with reference to FIGS. 9-12. Each of the data packets generally also includes whole data blocks for cryptographically processing by the block cipher 36.

In some embodiments, the packet processing circuitry 28 is configured to cryptographically process the received data blocks using the block cipher 36 so as to write the corresponding cryptographically processed data blocks to the memory 32 of the host computer 16 via the host interface 26, while holding segments of respective received data blocks in the memory 32 (or any suitable memory), such that the packet processing circuitry 28 stores segment S1 in the memory 32 (or any suitable memory) until packet P2 is received via the network interface 20, and then cryptographically processes the segments S1 and S2 together so as to write the corresponding cryptographically processed data block to the memory 32 of the host computer 16 via the host interface 26.

The step of block 304 may include one or more sub-steps of blocks 30-312 described in more detail below.

If the received data blocks are plaintext, the packet processing circuitry 28 is configured to encrypt (block 306) the received data blocks using the block cipher 36 so as to write corresponding ciphertext data blocks to the memory 32 (or any suitable memory). The packet processing circuitry 28 is optionally configured to compute (block 308) respective signatures of the received data blocks or the ciphertext data blocks. The steps of blocks 306 and 308 may be performed in any order. For example, the signatures may be computed based on plaintext blocks or on ciphertext blocks. Computation of cryptographic keys was described above in more detail with reference to FIG. 7.

If the received data blocks are ciphertext, the packet processing circuitry 28 is optionally configured to authenticate (block 310) respective signatures of the received data blocks or the plaintext data blocks (i.e., after decryption). The packet processing circuitry 28 is configured to decrypt (block 312) the received data blocks using the block cipher 36 so as to write corresponding plaintext data blocks to the memory 32 (or any suitable memory). The steps of blocks 310 and 312 may be performed in any order. For example, the signatures may be authenticated using the plaintext blocks or the ciphertext blocks.

The packet processing circuitry 28 is configured to write (block 314) the cryptographically processed data blocks and optionally computed signatures to the memory 32 (or any suitable memory). In some embodiments, the packet processing circuitry 28 is configured to write respective plaintext data blocks to the memory 32 responsively to respective signatures being authenticated. In other words, plaintext data blocks of which corresponding signatures have been successfully authenticated are written to the memory 32, while plaintext data blocks where their corresponding signatures have not been successfully authenticated are not written to the memory 32.

Figure 9:
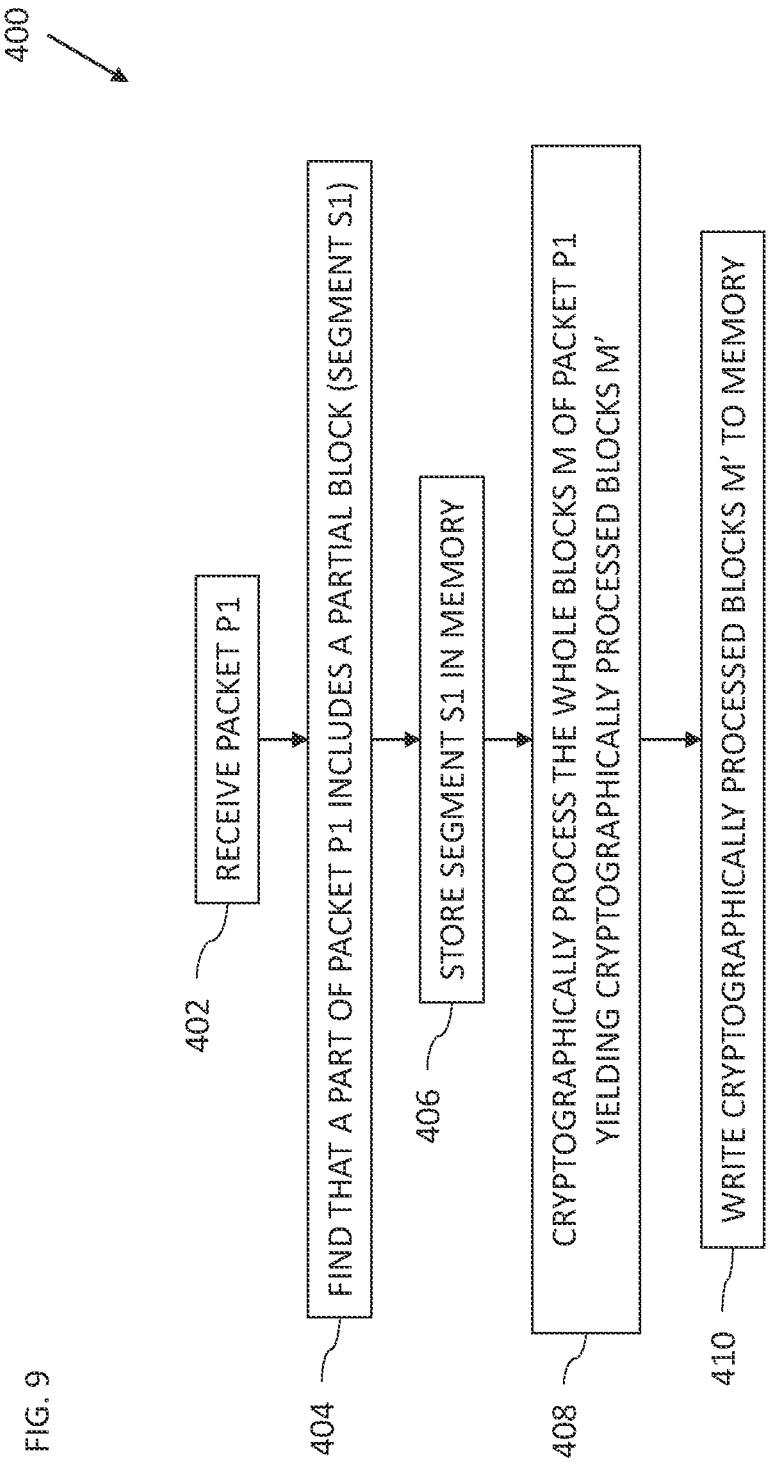
FIG. 9 is a flowchart including steps in a method of cryptographically processing data blocks of a first packet in the system of FIG. 1.
Figure 10:
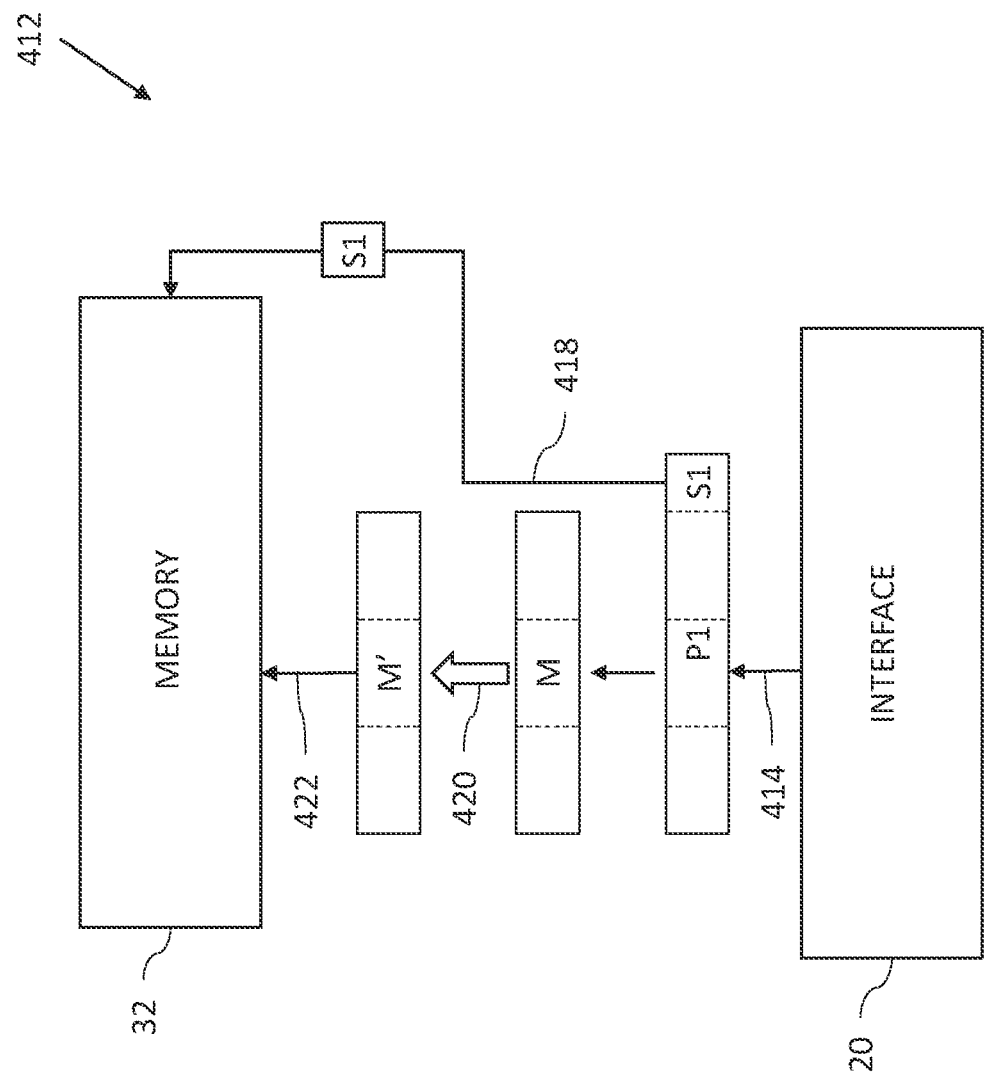
FIG. 10 is a block diagram illustrating the method of the flowchart of FIG. 9.

Reference is now made to FIGS. 9 and 10. FIG. 9 is a flowchart 400 including steps in a method of cryptographically processing data blocks of a first packet in the system 10 of FIG. 1. FIG. 10 is a block diagram 412 illustrating the method of the flowchart of FIG. 9. Reference is also made to FIG. 1.

The packet processing circuitry 28 is configured to receive (block 402, arrow 414 of FIG. 10) a packet P1 over the network interface 20. The packet processing circuitry 28 is configured to find (block 404) that a part of packet P1 includes a partial block (segment S1). The packet processing circuitry 28 is configured to store (block 406, arrow 418 of FIG. 10) segment S1 in the memory 32 (or any suitable memory). The packet processing circuitry 28 is configured to cryptographically process (block 408, arrow 420 of FIG. 10) the whole blocks M of packet P1 yielding cryptographically processed blocks M'. The packet processing circuitry 28 is configured to write (block 410, arrow 422 of FIG. 10) the cryptographically processed blocks M' to the memory 32 (or any suitable memory).

Figure 11:
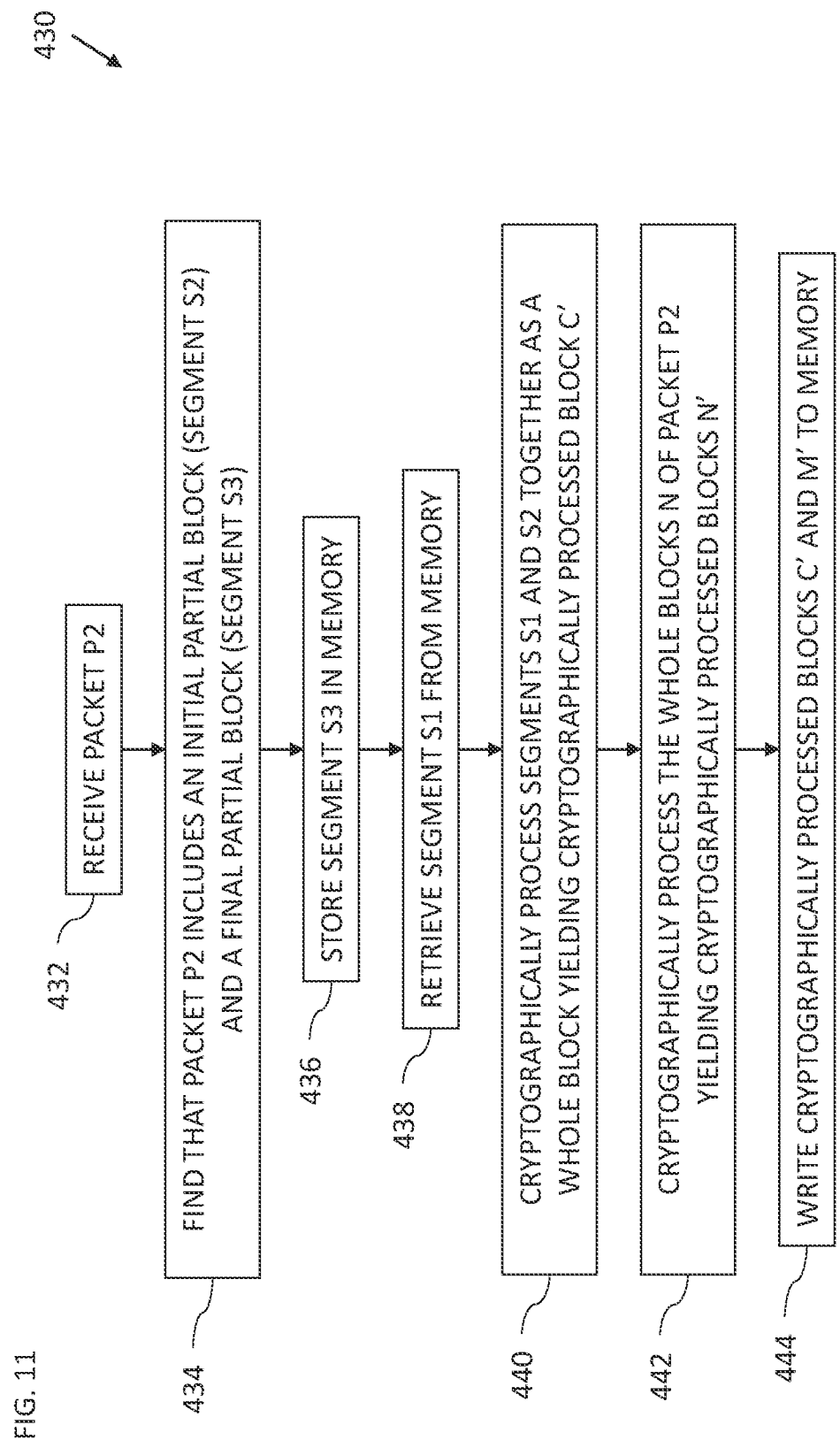
FIG. 11 is a flowchart including steps in a method of cryptographically processing data blocks of a second packet in the system of FIG. 1.
Figure 12:
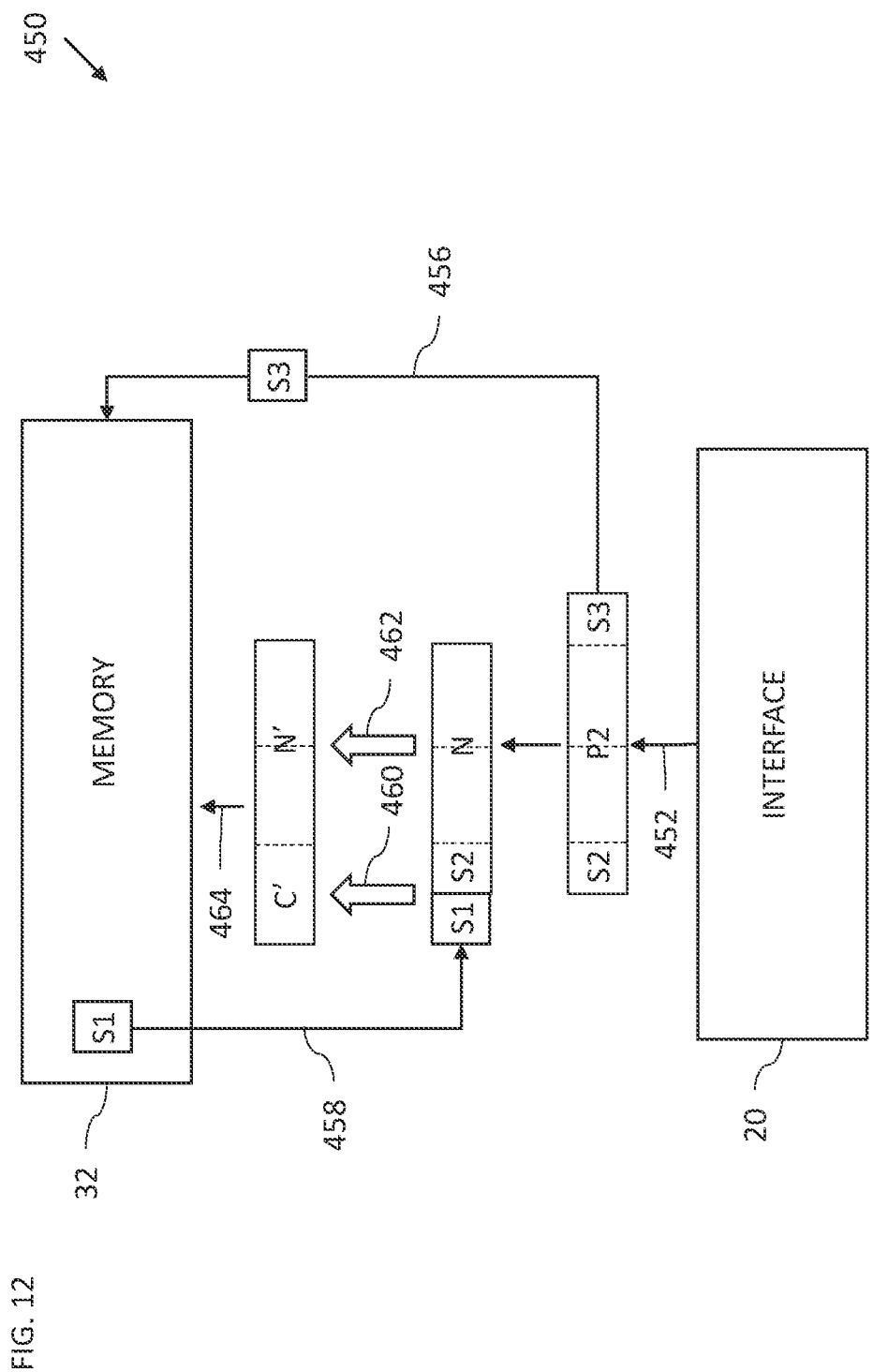
FIG. 12 is a block diagram illustrating the method of the flowchart of FIG. 11.

Reference is now made to FIGS. 11 and 12. FIG. 11 is a flowchart 430 including steps in a method of cryptographically processing data blocks of a packet P2 in the system 10 of FIG. 1. FIG. 12 is a block diagram 450 illustrating the method of the flowchart of FIG. 11. Reference is also made to FIG. 1.

The packet processing circuitry 28 is configured to receive (block 432, arrow 452 of FIG. 12) a packet P2 over the network interface 20. The packet processing circuitry 28 is configured to find (block 434) that packet P2 includes an initial partial block (segment S2) and a final partial block (segment S3). The packet processing circuitry 28 is configured to store (block 436, arrow 456 of FIG. 12) segment S3 in memory. The packet processing circuitry 28 is configured to retrieve (block 438, arrow 458 of FIG. 12) segment S1 from the memory, responsively to finding segment S2 in packet P2.

The packet processing circuitry 28 is configured to cryptographically process (block 440, arrow 460 of FIG. 12) segments S1 and S2 together as a whole block using the block cipher 36 yielding a cryptographically processed block C', responsively to finding that segment S2 is a partial block. The packet processing circuitry 28 is configured to cryptographically process (block 442, arrow 462 of FIG. 12) the whole blocks N of packet P2 yielding cryptographically processed blocks N'. The packet processing circuitry 28 is configured to write (block 444, arrow 464 of FIG. 12) cryptographically processed blocks C' and M' to the memory 32 (or any suitable memory).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub combinations of the various features described hereinabove, as well as variations and modifications thereof which would occur to persons skilled in the art upon reading the foregoing description and which are not disclosed in the prior art.

What is claimed is:

1. Data communication apparatus, comprising:
 a network interface which comprises one or more ports for connection to a packet data network and is configured to receive a sequence of data packets from a remote device over the packet data network via the one or more ports responsively to a data transfer request, the received sequence including received data blocks, ones of the received data blocks having block boundaries that are not aligned with payload boundaries of the packets, such that respective ones of the received data blocks are divided into two respective segments contained in successive respective ones of the packets in the sequence; and
 packet processing circuitry configured to cryptographically process the received data blocks using a block cipher so as to write corresponding cryptographically processed data blocks to a memory, while holding segments of respective ones of the received data blocks in the memory, such that the packet processing circuitry stores a first segment of a respective one of the received data blocks of a first one of the packets in the memory until a second one of the packets is received via the network interface, and then cryptographically processes the first and second segments together so as to write a corresponding cryptographically processed data block to the memory,
 wherein the packet processing circuitry is configured to:
 find that the second segment is a partial block; and
 retrieve the first segment from the memory, and cryptographically process the first and second segments together as a whole block using the block cipher, responsively to the second segment being a partial block.

2. The apparatus according to claim 1, further comprising a host interface configured to be connected to a host computer having a processing unit configured to manage fulfilment of the data transfer request, wherein the packet processing circuitry is configured to cryptographically process the received data blocks using the block cipher so as to write the corresponding cryptographically processed data blocks to the host computer via the host interface, while holding segments of respective ones of the received data blocks in the memory, such that the packet processing circuitry stores the first segment of the respective received data block of the first packet in the memory until the second packet is received via the network interface, and then cryptographically processes the first and second segments together so as to write the corresponding cryptographically processed data block to the host computer via the host interface.

3. The apparatus according to claim 1, wherein each of the data packets includes whole data blocks for cryptographically processing by the block cipher.

4. The apparatus according to claim 1, wherein the packet processing circuitry is configured to:
 read cryptographic parameters registered in the memory by a processing unit, the cryptographic parameters including an initial cryptographic key and an initial value;
 compute a first cryptographic key responsively to the initial cryptographic key and the initial value;
 cryptographically process a first block of the received data blocks responsively to the first cryptographic key;
 compute an updated value responsively to the initial value and a size of the first block;
 compute a second cryptographic key responsively to the initial cryptographic key and the updated value;
 cryptographically process a second block of the received data blocks responsively to the second cryptographic key; and
 write the cryptographically processed first block and second block to the memory.

5. The apparatus according to claim 4, wherein the updated value is indicative of a storage location of the second block.

6. The apparatus according to claim 1, wherein the packet processing circuitry is configured to encrypt the received data blocks using the block cipher so as to write corresponding ciphertext data blocks to the memory.

7. The apparatus according to claim 6, wherein the packet processing circuitry is configured to: compute respective signatures of the received data blocks or the ciphertext data blocks; and write the computed signatures to the memory.

8. The apparatus according to claim 1, wherein the packet processing circuitry is configured to decrypt the received data blocks using the block cipher so as to write corresponding plaintext data blocks to the memory.

9. The apparatus according to claim 8, wherein the packet processing circuitry is configured to: authenticate respective signatures of the received data blocks or the plaintext data blocks; and write respective ones of the plaintext data blocks to the memory responsively to respective ones of the signatures being authenticated.

* * * * *